May 3, 1932.  J. S. HARRISON  1,856,074

LIQUID HEATING AND VAPORIZING

Filed March 22, 1928

INVENTOR.

John Stewart Harrison

BY

Fay Oberlin & Fay

ATTORNEYS

Patented May 3, 1932

1,856,074

UNITED STATES PATENT OFFICE

JOHN STEWART HARRISON, OF CLEVELAND HEIGHTS, OHIO, ASSIGNOR TO THE STANDARD OIL COMPANY, OF CLEVELAND, OHIO, A CORPORATION OF OHIO

LIQUID HEATING AND VAPORIZING

Application filed March 22, 1928. Serial No. 263,779.

Where liquids immiscible with water and of lighter specific gravity are to heated, there is a tendency for any water present to occur in pockets or segregated masses underneath, and with sufficient heat such water flashes into vapor, overcoming the superincumbent head and boils the tank or container over or occasions an explosion. Particularly, where the liquid concerned is inflammable, as for instance in the case of oils, the results of such occurrences may be far-reaching. Avoidance of these diffiulties is accordingly fundamentally important, and the provision of some adequate prevention is correspondingly highly desirable.

To the accomplishment of the foregoing and related ends, the invention, then, consists of the features hereinafter fully described, and particularly pointed out in the claims, the following description and the annexed drawings setting forth in detail certain illustrative embodiments, such however representing but a few of the various ways in which the principle of the invention may be applied.

In said annexed drawings:—

Figure 1:
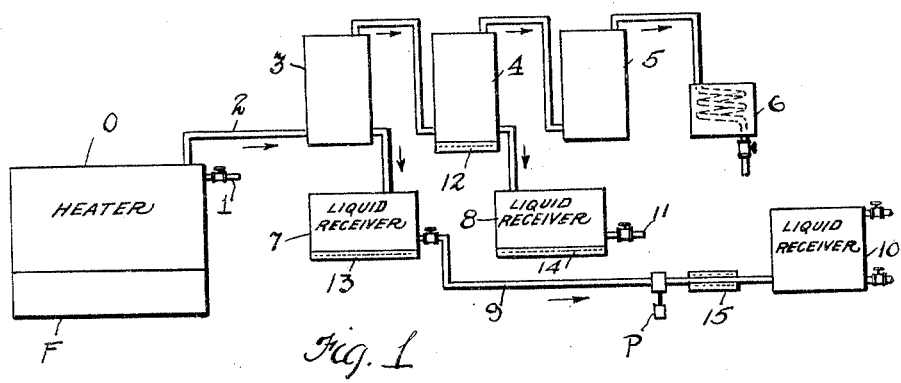
Figure 2:
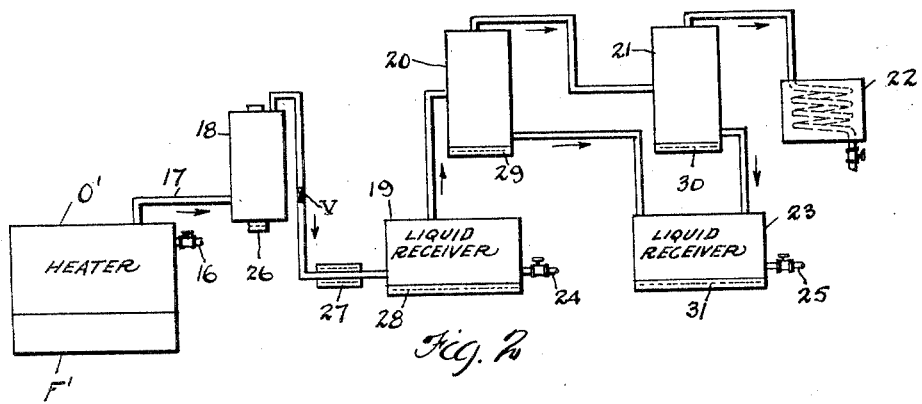
Figure 3:
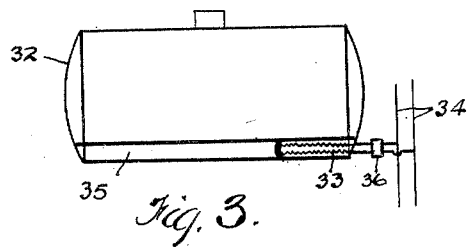

Fig. 1 represents semidiagrammatically an illustrative embodiment of apparatus in accordance with the invention; Fig. 2 is a similar view of another embodiment; and Fig. 3 is a side elevation, on larger scale and with parts broken away, showing further details of apparatus contemplated.

In its general aspects, the invention involves heating the liquid concerned and selectively controlling water present so as to effect its vaporization and elimination without abrupt disturbances.

If the liquid to be heated is in a tank or the like and water has gravitationally separated out at the bottom and under conditions where its tapping off is impossible, in accordance with the present invention such water may be eliminated by progressive vaporization, heat being applied selectively by suitable means independently of the general heating. Similarly, where the liquid is being pumped into a hot tank under conditions such that slugs of water may be included in the stream, these may be broken up with progressive vaporization by a suitably arranged local heater on the forwarding pipe, so that sufficient dissemination is had to avoid abrupt vaporization en masse as would otherwise occur if the water were pumped into the heated body of liquid. Instances of such situations may be noted in the handling of certain organic chemical substances, oils, etc., in tanks or tank cars, also in connection with distillation of tars or derivatives or petroleum.

In a plan for operating upon petroleum, and comprising in general a heating container O having a suitable furnace or the like F, and an outlet connection 2, a series of containers 3, 4, 5, 7, 8, 10, is presented. If the heating container O be a coking still, and the containers 3, 4 and 5, a series of towers or partial condensers with a final condenser 6, containers 7 and 8 may be a series of drums, and 10 a hot tank into which molten tailings or like liquid is forwarded by pipe 9 and pump P. Under conditions of cooling, water initially present in the crude, or introduced by steaming out especially, tends to settle into the lower portions of the containers, and in accordance with the present invention, I apply to those points of particular importance a selective heating means controllable independently of the general operating heat. While in some instances such heating means may be provided by damper-controlled extension flue system, or by special heating coils, ordinarily I prefer electrical heating means, and this may advantageously be in the form of resistance elements, as nichrome ribbon or the like wound in zigzag form adjacent the sump or lowest portion of the respective containers, and being suitably then encased with insulative covering. As shown in Fig. 1, a heater 12 is applied at the base of container 4, and heaters 13 and 14 at the bases of containers 7 and 8 respectively. A heater 15 is furthermore applied to the pipe 9, and tank 10 may be provided with lagging or insulation as usual where a hot tank equipment is employed.

With such general installation, it will be seen that with oil supplied through feed connection 1 and heated to distillation temperature in the container or still O, portions pass off through the connection 2 to the series of towers 3, 4, 5, and partial condensates pass on down into tanks 7 and 8. With water pocketed for instance at the base of containers 4, 7 or 8, heat may be selectively applied by the heaters 12, 13, 14, such as to progressively vaporize the water and allow of its passing on over through the system without abrupt disturbances, it being thence finally vented or trapped out. While operating on a coking basis for instance, with formation of tailings or such like passing into container 7, further handling thereof is largely facilitated, if water be present from steaming, etc., by applying heat through heater 15 on the way to tank 10. With such a system, while safety valves may be readily provided to carry a load up to for instance two and one-half pounds above atmospheric pressure, it will readily be seen that such safeguards as are provided in the present invention make possible the elimination of water in a manner to prevent abrupt burdens upon any part of the system, the numerous relatively constricted connections in effect tending to partially isolate certain containers in the sense of more or less handicapping them from protection of the main safety valve, and any detrimental boiling over or other consequence is avoided.

In the form shown in Fig. 2, the heater O' may be a pipe-heater or coil mounted over the furnace F', and having discharge 17 to a drum 18, with further connections to drum 19 and fractionating condensers 20 and 21, with a final condenser 22, and a drum 23 in communication with the heavy ends of the towers 20 and 21. Heaters 26, 28, 29, 30 and 31 are applied to the sumps or lowest portions of the drums 18, 19, fractionators 20, 21, and drum 23 respectively. As a further safeguard, a heater 27 may be installed on the pipe connecting the drums 18 and 19.

With this form, analogously to the plant layout already discussed, oil supplied through feed inlet 16 is brought up to the desired temperature in the heater O', and is forwarded to the drum 18, which for instance may be guarded against substantial heat loss by insulative covering or the like, and proceeding through a release valve V enters drum 19, where under the lessened pressure vapors separate and proceed to fractionators 20, 21, while heavier fractions at the base of the fractionators are collected finally in drum 23, or in separate drums for the respective towers as may be desired. Water may accumulate at the various settling out points made possible in such a system, but by selectively applying heat at the sumps or lower portions, as by the heaters 26, 28, 29, 30, 31, such water accumulations may be quietly eliminated or prevented, the water vapors being assimilated and passed off further to the end of the system, where under the still further reduced pressure venting or trapping out may be had. The precise temperatures for the heaters will necessarily depend upon individual run requirements, and will be usually at or above the temperature of the oil or the like coming to such point; for instance a temperature of 775–925° F. for heater 26. Lower temperatures will suffice for the subsequent heaters, as the oil temperature is lower. Local heater 27 on the connecting pipe between drum 18 and 19 affords a further safeguard against possible slugs of water. The various details as to the plant equipment may of course be varied considerably and a showing of such in minutiæ is immaterial in the present connection, for any of the general plant layouts considered.

Referring now more particularly to Fig. 3, there is shown a container or tank 32, having on its lowermost portion or sump, an electric heater made up of resistance ribbons or the like 33 positioned with thin insulation against the tank wall and having a covering of insulative lagging 35. A suitable connection and control 36 fed from the electric current means 34 serves to provide the current controllably to the heating elements. As will be seen, such tank 32 may be in a permanent mount in the plant, as suggested in the layouts foregoing, or it may be a portable container in the form of a tank car. Particularly, where heavy road oils, asphalts, waxes, and analogous materials which must be heated in order to render sufficiently fluent for removal, are concerned, it is customary to employ tanks with a bank of steam coils mounted within the tank, and not infrequently such steam coils spring a leak, thereby introducing an undesired amount of water condensate into the bottom of the tank. In such event, the localized heater as illustrated in Fig. 3, provides a means by which such accumulation of water may be progressively and quietly eliminated by vaporization, without incurring the possibility of its abrupt vaporization en masse when the general oil temperature reaches a sufficiently high point. Thereby, disastrous boiling over or ejection of the tank contents may be avoided.

In the electric heaters as indicated in Figs. 1 and 2, the actual position may be outside or inside the container shell, as preferred, and in particular, where there is a removable man-head cover, as in the drum 18, such heater may be conveniently mounted on the inside of the man-head cover. Instead of heating by direct resistance heat, I also contemplate in some instances using the wires with the feed of alternating current in a manner to secure inductive heating at the corresponding portions of the shell.

Other modes of applying the principle of the invention may be employed, change being made as regards the details disclosed, provided the means or steps stated in any of the following claims, or the equivalent of such, be employed.

I therefore particularly point out and distinctly claim as my invention:—

1. In a process of the character described, inhibiting disruptive vaporization of pocketed water under a lighter-gravity liquid of higher boiling point by applying a hot spot at the location of such pocketed water with a temperature selectively active upon the pocketed water without vaporizing the pocketing liquid.

2. In a process of the character described, inhibiting disruptive vaporization of water pocketed under lighter-gravity hydrocarbons of higher boiling point by selectively applying vaporizing heat to the location of such pocketed water without vaporizing the pocketing hydrocarbons.

3. In a process of the character described, subjecting hydrocarbons to distillation, and inhibiting disruptive vaporization of water pocketed under the liquid hydrocarbons of higher boiling point beyond the distilling zone by selectively applying vaporizing heat to the location of such pocketed water without vaporizing the pocketing hydrocarbons.

4. In apparatus of the character described, a liquid container, water-collecting means therein of small size relative to the container for collecting water separated from a lighter-gravity liquid, and means for selectively applying heat at said water-collecting means.

5. In apparatus of the character described, a liquid container, water-collecting means therein of small size relative to the container for collecting water separated from a lighter-gravity liquid, and an electric heater localized at said water-collecting means.

6. In apparatus of the character described, a liquid-container, means for supplying a heated liquid thereto, sump-means therein of small size relative to the container for gravitationally collecting water separated from such liquid, and means for selectively applying heat to the water in said sump-means without vaporizing the upper mass of higher boiling liquid, said means comprising electric heating means localized at the water-collecting sump.

Signed by me this 9th day of March, 1928.

JOHN STEWART HARRISON.